United States Patent [19]

Eiland

[11] 3,767,461

[45] Oct. 23, 1973

[54] RAPID CURING COMPOSITION AND METHOD

[75] Inventor: Ehrlich M. Eiland, Lower Burrell, Pa.

[73] Assignee: Aluminum Company of America, Pittsburgh, Pa.

[22] Filed: Aug. 31, 1972

[21] Appl. No.: 285,473

[52] U.S. Cl... 117/132 B, 117/132 BE, 260/32.8 R, 260/32.8 EP, 260/33.4 R, 260/33.4 EP, 260/33.6 EP, 260/33.6 UA

[51] Int. Cl............................................. B44d 1/36

[58] Field of Search.................. 260/77.5 AB, 2 EP, 260/928; 117/132 B, 132 BE

[56] References Cited

UNITED STATES PATENTS

| | | | |
|---|---|---|---|
| 3,003,983 | 10/1961 | Cox | 260/29.2 TN |
| 3,186,868 | 6/1965 | Hirshfeld | 117/136 |
| 3,307,951 | 3/1967 | Adams | 96/86 |
| 2,976,170 | 3/1961 | Eiland | 117/49 |

Primary Examiner—Morris Leibman
Assistant Examiner—P. R. Michl
Attorney—Abram W. Hatcher

[57] ABSTRACT

Use of a phytic acid catalyst in accelerated curing of thermosetting coatings.

10 Claims, No Drawings

RAPID CURING COMPOSITION AND METHOD

BACKGROUND OF THE INVENTION

1. Field of the Invention

This invention relates to curing thermosetting coatings on a substrate. More particularly, it relates to accelerating the curing of thermosetting coatings on metal substrates such as aluminum, especially foil or sheet, for example, can sheet, by use of a special catalyst. When I refer to aluminum, I include aluminum and aluminum base alloys containing at least 50 percent by weight aluminum.

2. Description of the Prior Art

In U. S. Pat. No. 2,976,170 I disclosed a method for rendering aluminum foil receptive to adhesion of thermoplastic coatings by treating the surface with phytic acid.

SUMMARY OF THE INVENTION

I have now found that phytic acid, when incorporated in a thermosetting coating, will, by acting as a catalyst, shorten the time and temperature required for curing the coating, for example, when coated on a metal substrate such as aluminum, including foil, sheet and laminates thereof. Representative of coatings which may be applied according to my invention are cross-linking resins such as thermosetting epoxies and vinyls. Essential ingredients of these coatings for the quicker and easier curing on the substrate are one or more resins, a solvent for the resin or resins and the phytic acid. They may also contain a cross-linking agent and other ingredients, for example, pigments, dyes and the like such as conventionally added to coating resin compositions. When I refer herein to the resin component of the coating, I include use of more than one cross-linking resin as said resin component, as will be illustrated in the examples hereinafter.

The resin or combination of resins is cured by heating, for example, in an oven. Generally the highest temperature required for curing according to the invention is 600° F, above which point some foil strength may be lost due to annealing, when the substrate is aluminum foil. Only a few seconds are required for curing the resin. Thickness of the cured coating generally varies from about 1 to about 10 mg/in². The time required for curing is usually less than about 10 seconds. The phytic acid may be added to the coating composition dissolved in an alcohol such as butyl, for example, 50:50 by weight.

DESCRIPTION OF THE PREFERRED EMBODIMENTS

The following examples are illustrative of the invention.

EXAMPLE 1

An epoxy-urea formaldehyde coating of approximately the following composition was applied to a sample of 1,145 (Aluminum Association designation) aluminum foil.

| Weight (g) | Material |
|---|---|
| 16.4 | Epon 1007* epoxy resin (Shell Chemical Co.) |
| 22.7 | Beckamine P196-60 urea formaldehyde (Reichold Chemical Co.) (60% resin) |
| 60.9 | Methyl Ethyl Ketone |
| 0.3 | 50% phytic acid in water | the chemical structure of a typical molecule of Epon resin is as follows:

The melting point by the Durrans mercury method is 125°–135° C, the color, 25° C (Gardner) of a 40 percent weight solution in butyl carbitol at 25° C 5 max., viscosity, 25° C (40 percent in butyl carbitol) Y-Z₁, (Gardner-Holdt), 18–28 poises and the epoxide equivalent (grams of resin containing one gram-equivalent of epoxide) 2,000–2,500.

The coating was cured on the foil in a 2-zone oven, the first zone being operated at a temperature of 350° F and the second at 400° F. The same coating, except for omission of the phytic acid, was applied to another sample of 1,145 aluminum foil. It required a curing temperature of 600° F in the first zone and 700° F in the second. The phytic acid-containing coating was cured at the rate of 350 ft/min, whereas the sample without catalyst was cured at only 250 ft/min. The catalyst-containing coated foil remained in the oven for curing only 5 seconds, whereas the non-catalytic coated foil required 7 seconds for curing. Cured coating thickness for both coatings was 1.25 mg/in².

EXAMPLE 2

Substantially the same compositions as used in Example 1 were cured on 1,145 aluminum foil in a 6-foot drying tunnel. The sample without the catalyst required a curing temperature of 490° F, whereas the sample with the phytic acid was cured at only 375° F. Both samples were cured at the rate of 25 ft/min to give a cured coating of 3 mg/in².

EXAMPLE 3

The following thermosetting vinyl coating composition was cured on 1,145 aluminum foil to a thickness of 1.8 mg/in² by passing through a heating zone at a rate of 50 ft/min and a temperature of 550° F and compared with the same composition similarly cured except for omission of the phytic acid catalyst.

| Weight (g) | Material |
|---|---|
| 80.43 | VAGH* vinyl solution (Union Carbide) (20% resin in MEK-toluene-isopropanol) (2:2:1 ratio) |
| 8.85 | Beckamine P196-60 urea formaldehyde (Reichold Chemical Company) (60% resin) |
| 10.72 | Epon 1001 epoxy resin solution (Shell Chemical Company) (25% resin in MEK) |
| 0.4 | 50% phytic acid in water |

*approximately 91 percent by weight vinyl chloride, 3 percent by weight vinyl acetate and 5.9 percent by weight other (hydroxyl calculated as vinyl alcohol), approximate specific gravity 1.39, viscosity at 25° C of a 1/1 MIBK/toluene solvent ratio solution 200–400 CPS.

Both compositions remained in the heating zone for 7 seconds. The composition without the catalyst was rubbed through to the underlying foil by one double rub with a rag soaked in methyl ethyl ketone, whereas it took 75 double rubs before the underlying foil coated with the phytic acid-containing composition was reached.

EXAMPLE 4

1 percent phytic acid (40 percent in water) based on coating solids was added to an epoxy coating which was applied to aluminum foil and cured at 325° F for 30 seconds. Good resistance to methyl ethyl ketone (MEK) and good adhesion on forming were obtained.

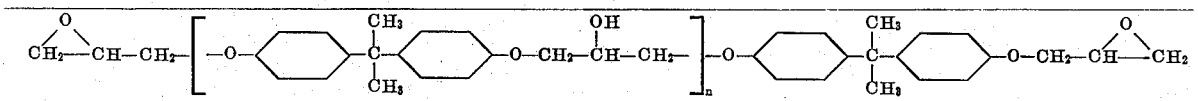

The same good results were obtained when white epoxy paste and molybdate orange paste were added to a phytic acid-catalyzed clear coating.

EXAMPLE 5

A comparison was made between adhesion after deformation and degree of cure on foil of an epoxy resin catalyzed by a prior art catalyst which did not contain phytic acid and the same resin containing phytic acid. As rolled 1,145 foil 0.004-inch thick was used. The prior art catalyst was added at 45 cc per gallon and the phytic acid (40percent active) was used at 0.3 lb per 83 lb clear epoxy. Drying was at 400° F for 5 seconds. Results showed removal of the conventionally catalyzed lacquer after 4 to 7 rubs with methyl ethyl ketone (MEK), whereas the phytic acid-catalyzed lacquer lasted for 30 to 50 rubs before lacquer removal. Adhesion on dead folding also proved better for the phytic acid-catalyzed lacquer.

EXAMPLE 6

A white-pigmented epoxy resin was tested in a manner similar to that employed in Example 5, both with and without phytic acid catalyst. The phytic acid catalyst resulted in a faster cure and better adhesion than the prior art catalyst.

EXAMPLE 7

An attempt was made to apply 2 lbs per 3,000 sq ft of a prior art-catalyzed red epoxy which contained no phytic acid to two sides of 0.00045-in. 1145 as-rolled foil. A prior art catalyzed red polyester was also tried. Because of the high temperature required for curing, severe wrinkling of the foil occurred in both instances. The following composition was then made up and applied:

| Weight (g) | Material |
| --- | --- |
| 132 | Mobil Chemical Co. S-8988-002-clear epoxy |
| 25 | Inmont — RBH Div. Watchung Red epoxy pigment dispersion |
| 40 | Solvent: (45MEK + 45 Toluol + 10 isopropanol) by volume |
| 0.28 | 50% phytic acid |

This coating was applied using a conventional coating machine and cured satisfactorily at above 100° F lower oven temperature than for the above red epoxy and red polyester phytic acid-free coatings. Drying conditions were 25 ft/min web speed, oven tunnel temperature 350° to 450° F and tunnel roll temperature 180°–210° F. At the lower curing temperature, made possible by using phytic acid, the wrinkling of the foil was eliminated.

EXAMPLE 8

An epoxy slip coat was catalyzed with an amount of phytic acid (100percent active basis) equal to 0.2percent by weight of the coating. Curing requirements and web speed for the phytic acid-catalyzed coating compared with the same coating employing a prior art catalyst were as follows:

| Catalyst | Web Speed Ft/Min. | Tunnel Zone 1 | Tunnel Zone 2 |
| --- | --- | --- | --- |
| Prior Art | 250 | 600°F | 700°F |
| Phytic Acid | 350 | 350°F | 400°F |

EXAMPLE 9

Addition of about 0.2percent (100percent active) phytic acid by weight, based on total coating weight, to a thermosetting vinyl polymer resin (Mobil Chemical Co. S-8998–001) permitted curing on aluminum foil to high solvent resistance at relatively low temperature. The lacquer cured with phytic acid prevented migration of pigment. At the same time curing temperature (<600° F) was low enough to prevent undesirable discoloration of the lacquer or brittleness caused by undesirable annealing which sometimes occurs when curing is done without using a phytic acid catalyst. In this instance the coating composition was as follows:

| Grams | Material |
| --- | --- |
| 79.7 | Mobil Chemical Co. thermoset vinyl |
| 19.9 | MEK — Toluene 1:1 |
| 0.4 | Phytic acid (50% active acid) |

The coating was applied at 1.8 lb per 3,000 sq ft to annealed foil, dried at 400° F for 15 seconds, and cured to the point where no coating was removed by 50 double rubs with methyl ethyl ketone. Adhesion to the foil was good, and clear Mobil S-1299 thermoplastic vinyl adhered well when applied over the coating. For comparison, when S-8998–001 thermoset vinyl, which contained no phytic acid catalyst, was applied and dried in the same manner, cure was unsatisfactory, and the coating was removed with only 12 double rubs with MEK.

Similar tests were made using Mobil 70×68 green and 70×682 purple, which are pigmented versions of the aforementioned S-8998-001 clear thermoset vinyls. Equally good results as with the clear were found with these colored coatings.

Further tests made according to the same procedure were conducted on 0.004 in. 1,145 aluminum foil using coating with and without phytic acid catalyst. Under the same curing conditions of 400° F, this time for 20 seconds, the acid-catalyzed coating gave better adhesion on forming than the uncatalyzed coating.

EXAMPLE 10

50 grams of phytic acid (50percent active) were added to 50 grams of butyl alcohol and boiled for 2 hours, 45 minutes. There was some brownish precipitate. This was allowed to settle, leaving liquid on top. The following composition was then made up, using this liquid.

| Grams | Material |
| --- | --- |
| 79.7 | Mobil Chemical Co. S-8998-001 clear thermoset vinyl |
| 19.5 | MEK — Toluene 1:1 |
| 0.8 | Phytic acid boiled with butanol (25% active acid) |

Viscosity of the coating over a period of 10 days aging was as follows:

| Time | Viscosity No. 2 Zahn Cup — Sec |
| --- | --- |
| Immediately after adding modified acid | 35 |
| 8 hours | 31 |
| 72 hours | 35 |
| 10 days | 35 |

The same composition, except that unmodified phytic acid in the same amount of active phytic acid was tried.

Viscosity change of aging the coating after adding the acid was as follows:

| Time | Viscosity No. 2 Zahn Cup — Sec |
|---|---|
| Immediately after adding phytic acid | 35 |
| 8 hours | 42 |
| 72 hours | 57 |
| 10 days | 57 |

Similar results were obtained with Mobil 70×682 purple and 70×681A green thermoset vinyls.

The boiled phytic acid-butanol solution after 11 days aging was still fully effective in curing coatings.

EXAMPLE 11

Epoxies were found to cure as well with the modified phytic acid (in butanol) as with the straight acid.

EXAMPLE 12

25 percent phytic acid solution (0.8 g.) was added to 100 g. of thermosetting vinyl coatings which were applied on 5,151 and 5,182 (Aluminum Association designation) (can sheet). Degree of cure was determined with MEK rubs as described hereinabove. Results of tests are given in the following table, which includes a comparison with the same compositions applied without the phytic acid.

TABLE

Coating weight—6 mg./in.$^2$

| Cure | Conversion coated | | Wash coated | |
|---|---|---|---|---|
| | .0095″ 5151 No catalyst | .0095″ 5151 Phytic acid | .0095″ 5151 No catalyst | .0095″ 5151 Phytic acid |
| 10′ at 300° F | 3 | 5 | 15-16 | 19-20 |
| 10′ at 350° F | 8 | 10 | 20 | 38 |
| 10′ at 400° F | 18-20 | 17 | 20-24 | 52-55 |
| 5′ at 400° F | 12-15 | | 13-15 | |

Coating weight >6 mg./in.$^2$

| Cure | Conversion coated | | Wash coated | |
|---|---|---|---|---|
| | .0135″ 5151 No catalyst | .0135″ 5151 Phytic acid | .0135″ 5151 No catalyst | .0135″ 5151 Phytic acid |
| 10′ at 200° F | 0 | 18-19 | | 100+ |
| 10′ at 250° F | 1+ | 55 | 2 | 100+ |
| 10′ at 300° F | 12 | 100+ | 5 | 100+ |
| 10′ at 350° F | 36-38 | 100+ | 39 | 100+ |
| 10′ at 400° F | 100+ | 100+ | 83-85 | 100+ |

While the invention has been described in terms of preferred embodiments, the claims appended hereto are intended to encompass all embodiments which fall within the spirit of the invention.

Having thus described my invention and certain embodiments thereof, I claim:

1. A method for producing a coating with improved curing characteristics which comprises adding phytic acid to a lacquer containing as essential ingredients a thermosetting vinyl or epoxy resin and a solvent for said resin, applying said lacquer to a substrate, and curing said lacquer on said substrate.

2. The method of claim 1 wherein the lacquer is cured on the substrate at a temperature of less than about 600° F and curing takes place to a thickness of from about 1 mg/in$^2$ to about 10 mg/in$^2$ of substrate surface in less than about 10 seconds.

3. The method of claim 1 wherein the substrate is aluminum.

4. The method of claim 1 wherein the substrate is aluminum foil.

5. The method of claim 1 wherein the substrate is aluminum sheet.

6. A method for producing a coating with improved curing characteristics which comprises adding phytic acid to butyl alcohol, boiling said solution of phytic acid and butyl alcohol, adding said solution to a lacquer containing as essential ingredients a thermosetting vinyl or epoxy resin and a solvent for said resin, applying said lacquer to a substrate, and curing said lacquer on said substrate at a temperature of less than about 600° F.

7. The method of claim 6 wherein the substrate is aluminum.

8. The method of claim 6 wherein the substrate is aluminum foil.

9. The method of claim 6 wherein the substrate is aluminum sheet.

10. The method of claim 6 wherein the substrate is aluminum can sheet.

\* \* \* \* \*